(12) United States Patent
Huang et al.

(10) Patent No.: US 12,317,129 B2
(45) Date of Patent: May 27, 2025

(54) BLUETOOTH COMMUNICATION METHOD, DEVICE AND SYSTEM FOR POINT-TO-POINT LINK

(71) Applicant: Shanghai Mountain View Silicon Co., Ltd., Shanghai (CN)

(72) Inventors: Qin Huang, Shanghai (CN); Huifang Shi, Shanghai (CN)

(73) Assignee: Shanghai Mountain View Silicon Co., Ltd., Shanghai (CN)

( * ) Notice: Subject to any disclaimer, the term of this patent is extended or adjusted under 35 U.S.C. 154(b) by 0 days.

(21) Appl. No.: 18/573,425

(22) PCT Filed: Jul. 20, 2022

(86) PCT No.: PCT/CN2022/106778
§ 371 (c)(1),
(2) Date: Dec. 21, 2023

(87) PCT Pub. No.: WO2023/082691
PCT Pub. Date: May 19, 2023

(65) Prior Publication Data
US 2024/0267787 A1    Aug. 8, 2024

(30) Foreign Application Priority Data

Nov. 10, 2021   (CN) .......................... 202111353804.6

(51) Int. Cl.
*H04W 4/80* (2018.01)
*H04L 5/00* (2006.01)
(Continued)

(52) U.S. Cl.
CPC .......... *H04W 28/06* (2013.01); *H04L 5/0078* (2013.01); *H04W 4/80* (2018.02); *H04W 16/20* (2013.01);
(Continued)

(58) Field of Classification Search
CPC ............... H04J 13/00026; H04L 47/23; H04N 21/43637; H04W 16/20; H04W 16/225; H04W 4/80; H04W 4/008
See application file for complete search history.

(56) References Cited

U.S. PATENT DOCUMENTS 9,107,026 B1 *   8/2015  Viswanadham ...... H04W 8/005
10,477,326 B2 *  11/2019 Miyasaka ............ H04R 25/558
(Continued)

FOREIGN PATENT DOCUMENTS

| CN | 105657646 A | 6/2016 |
|---|---|---|
| CN | 109327829 | 2/2019 |

(Continued)

*Primary Examiner* — Salvador E Rivas
(74) *Attorney, Agent, or Firm* — IPRTOP LLC

(57) ABSTRACT

A Bluetooth communication method, a Bluetooth communication device, and a Bluetooth communication system are provided. The Bluetooth communication method comprises: segmenting a first signal data based on a length of a first time slice, performing a compression-encoding to construct a plurality of first private-chain packets; constructing and transmitting a plurality of first-standard Bluetooth packets, and transmitting one of the plurality of first private-chain packets to a second terminal of a device of the link in an idle time of a transmission slot in which one corresponding first-standard Bluetooth packet is transmitted, so that the second terminal of the device obtains the first signal data by decoding the corresponding first private-chain packet. The above method transmits the signal data in the idle time, thereby improving the efficiency of signal transmission and reducing communication latency.

17 Claims, 8 Drawing Sheets

(51) Int. Cl.
*H04W 16/20* (2009.01)
*H04W 16/22* (2009.01)
*H04W 28/06* (2009.01)
*H04W 72/0446* (2023.01)
*H04W 72/12* (2023.01)
*H04N 21/4363* (2011.01)
*H04W 72/25* (2023.01)

(52) U.S. Cl.
CPC ..... *H04W 16/225* (2013.01); *H04W 72/0446* (2013.01); *H04W 72/1221* (2013.01); *H04N 21/43637* (2013.01); *H04W 72/25* (2023.01)

(56) References Cited

U.S. PATENT DOCUMENTS

| | | | | |
|---|---|---|---|---|
| 2004/0085917 | A1* | 5/2004 | Fitton | H04L 1/0061 370/290 |
| 2013/0260686 | A1 | 10/2013 | Mukherjee | |
| 2016/0249356 | A1 | 8/2016 | Pope | |
| 2017/0011630 | A1* | 1/2017 | Nagamma | G08G 1/127 |
| 2018/0248811 | A1* | 8/2018 | Di Nallo | H04L 5/0087 |
| 2018/0262866 | A1* | 9/2018 | Haverinen | H04B 17/20 |
| 2020/0162848 | A1* | 5/2020 | Zhang | H04W 4/02 |
| 2021/0400389 | A1* | 12/2021 | Li | H04W 4/80 |
| 2022/0231971 | A1* | 7/2022 | Liu | H04L 47/36 |

FOREIGN PATENT DOCUMENTS

| | | |
|---|---|---|
| CN | 109327829 A | 2/2019 |
| CN | 109495867 A | 3/2019 |
| CN | 111405534 A | 7/2020 |
| CN | 111901730 | 11/2020 |
| CN | 111901730 A | 11/2020 |
| CN | 113056008 A | 6/2021 |
| CN | 114025430 A | 2/2022 |

* cited by examiner

Segmenting a first signal data based on a length of a first time slice and performing a compression-encoding based on a customized packaging rule through a master device to construct a plurality of first private-chain packets; and the slave device segmenting a second signal data based on a length of a second time slice and performing a compression-encoding based on the customized packaging rule through a slave device to construct a plurality of second private-chain packets  ⸻ S21

Transmitting one first-standard Bluetooth packet in a first transmission slot through the master device, and transmitting one first private-chain packet through the master device to the slave device in an idle time of the first transmission slot in which the first-standard Bluetooth packet is transmitted, so that the slave device obtains the first signal data based on the first private-chain packet; constructing and transmitting a second-standard Bluetooth packet through the slave device in a second transmission slot, and transmitting one second private-chain packet through the slave device in an idle time of the second transmission slot in which the second-standard Bluetooth packet is transmitted, after the slave device receives the first-standard Bluetooth packet, so that the master device obtains the second signal data based on the second private-chain packet  ⸻ S22

FIG. 3

BLUETOOTH COMMUNICATION METHOD, DEVICE AND SYSTEM FOR POINT-TO-POINT LINK

FIELD OF TECHNOLOGY

Background

Bluetooth communication technology has become one of the most important wireless communication methods, with advantages such as low power consumption and long communication distance. However, existing Bluetooth communication technology typically has a certain delay of several tens of milliseconds or even more than 100 milliseconds in the signal interaction process. Therefore, it cannot meet the real-time and low latency signal transmission requirements of audio and video communication applications. This is especially true for wireless audio applications that require audio and video synchronization, such as wireless microphones for karaoke and gaming headsets.

In view of high latency in existing Bluetooth communication, many low-latency audio interaction schemes have been proposed. However, these schemes are often based on wireless control methods/systems that are developed and adapted for one specific application scenario, which are not compatible with commonly used standard Bluetooth protocols and other general protocols. This results in insufficient compatibility of the developed wireless control methods/systems, narrow application range, inability of Bluetooth devices under different control methods/systems to connect and communicate with each other, as well as high development costs and long development cycles.

SUMMARY

The present disclosure provides a Bluetooth communication method, a Bluetooth communication device, and a Bluetooth communication system.

A first aspect of the present disclosure provides a Bluetooth communication method. The Bluetooth communication method, used for a first terminal of a device of a point-to-point link, comprising: segmenting a first signal data based on a length of a first time slice and performing a compression-encoding to construct a plurality of first private-chain packets; constructing a plurality of first-standard Bluetooth packets and transmitting each of the plurality of first private-chain packets in an idle time of a transmission slot in which one corresponding first-standard Bluetooth packet is transmitted, so that a second terminal of the device of the link obtains the first signal data by decoding the plurality of first private-chain packets.

In an embodiment of the present disclosure, the first terminal of the device comprises a package unit of the first private-chain packet, and constructing the plurality of first private-chain packets comprises constructing the plurality of first private-chain packets by the package unit of the first private-chain packet.

In an embodiment of the present disclosure, constructing the plurality of first-standard Bluetooth packets comprises constructing one of the plurality of first-standard Bluetooth packets for one transmission slot.

In an embodiment of the present disclosure, an information data used for constructing the plurality of first-standard Bluetooth packets is in a form of an array, and constructing the plurality of first-standard Bluetooth packets comprises inputting the information data in the form of the array, and ensuring a depth of the array greater than a payload of each of the plurality of first-standard Bluetooth packets at any time.

In an embodiment of the present disclosure, the Bluetooth communication method further comprises: before transmitting one of the plurality of first private-chain packets, determining a signal modulation mode of the first private-chain packet based on a type of one corresponding first-standard Bluetooth packet that is transmitted in the same transmission slot as the first private-chain packet.

In an embodiment of the present disclosure, the Bluetooth communication method further comprises: reducing a transmission frequency of a command Bluetooth packet in the link while constructing the plurality of first-standard Bluetooth packets.

A second aspect of the present disclosure provides another Bluetooth communication method. The Bluetooth communication method used for a first terminal of a device of a point-to-point link with bidirectional communication comprises: receiving one of a plurality of first-standard Bluetooth packets transmitted by a second terminal of the device of the link, receiving one of the plurality of first private-chain packets transmitted by the second terminal of the device in an idle time of a transmission slot in which the first-standard Bluetooth packet is transmitted, and decoding the first private-chain packet by the first terminal of the device to obtain a corresponding first signal data.

In an embodiment of the present disclosure, the Bluetooth communication method further comprises: segmenting a second signal data based on a length of a second time slice and performing a compression-encoding to construct a plurality of second private-chain packets, wherein the length of the second time slice equals to a length of a first time slice that is for the second terminal of the device to construct the plurality of first private-chain packets; after receiving one of the plurality of first-standard Bluetooth packets in a first transmission slot, constructing a plurality of second-standard Bluetooth packets and transmitting one of the plurality of second-standard Bluetooth packets in a second transmission slot, and transmitting one of the plurality of second private-chain packets in an idle time of the second transmission slot, so that the second terminal of the device obtains the second signal data after decoding the corresponding second private-chain packet.

In an embodiment of the present disclosure, the Bluetooth communication method further comprises: before transmitting one of the plurality of second private-chain packets, determining a signal modulation mode of the second private-chain packet based on a type of one corresponding second-standard Bluetooth packet that is transmitted in the same transmission slot as the second private-chain packet.

In an embodiment of the present disclosure, the Bluetooth communication method further comprises: after decoding one of the plurality of first private-chain packets in a first transmission slot to obtain the first signal data, performing a re-transmission detection on the first signal data to obtain a detection result, adding the detection result into one of the plurality of second private-chain packets that is transmitted in a second transmission slot, so that the second terminal of the device obtains the detection result after decoding the second private-chain packet, and determines whether or not to re-transmit the first private-chain packet in an idle time of a third transmission slot.

A third aspect of the present disclosure provides a Bluetooth communication device. The Bluetooth communication device, used for a point-to-point link, comprising: a package unit of standard Bluetooth packet, used for constructing a plurality of first-standard Bluetooth packets and transmitting each of the plurality of first-standard Bluetooth packets to a transmitting unit; a package unit of private-chain packets, used for segmenting a first signal data based on a length of a first time slice, performing a compression-encoding to construct a plurality of first private-chain packets, and transmitting each of the plurality of first private-chain packets to the transmitting unit; and the transmitting unit, used for transmitting each of the plurality of first-standard Bluetooth packets, and transmitting each of the plurality of first private-chain packets in an idle time of a transmission slot in which one corresponding first-standard Bluetooth packet is transmitted.

In an embodiment of the present disclosure, the Bluetooth communication device further comprises: a receiving unit, used for receiving each of a plurality of second-standard Bluetooth packets transmitted by a second terminal of a device of the link, and receiving each of a plurality of second private-chain packets transmitted by the second terminal of the device in an idle time of a transmission slot in which one corresponding second-standard Bluetooth packet is transmitted; and a decoding unit of private-chain packet, used for decoding the plurality of second private-chain packets to obtain a corresponding second signal data.

In an embodiment of the present disclosure, the Bluetooth communication device further comprises: a package control unit, used for controlling the package unit of standard Bluetooth packet to construct the plurality of first-standard Bluetooth packets; and a signal modulation unit, used for determining, before transmitting each of the plurality of first private-chain packets, a signal modulation mode of each of the plurality of first private-chain packets based on a type of one corresponding first-standard Bluetooth packet that is transmitted in the same transmission slot as the first private-chain packet.

A fourth aspect of the present disclosure provides another Bluetooth communication device. The Bluetooth communication device, used for a point-to-point link with bidirectional communication, comprising: a receiving unit, used for receiving each of a plurality of first-standard Bluetooth packets transmitted by a second terminal of a device of the link, and receiving each of a plurality of first private-chain packets transmitted by the second terminal of the device in an idle time of a transmission slot in which one corresponding first-standard Bluetooth packet is transmitted; and a decoding unit of private-chain packet used for decoding the plurality of first private-chain packets to obtain a corresponding first signal data.

In an embodiment of the present disclosure, the Bluetooth communication device further comprises: a package unit of standard Bluetooth packet, used for constructing a plurality of second-standard Bluetooth packets and transmitting each of the plurality of second-standard Bluetooth packets to a transmitting unit; a package unit of private-chain packet, used for segmenting a second signal data based on a length of a second time slice, performing a compression-encoding to construct a plurality of second private-chain packets, and transmitting each of the plurality of second private-chain packets to the transmitting unit, wherein the length of the second time slice equals to a length of a first time slice that is for the second terminal of the device to construct the plurality of first private-chain packets; the transmitting unit, used for transmitting, after receiving one of the plurality of first-standard Bluetooth packets in a first transmission slot, one of the plurality of second-standard Bluetooth packets in a second transmission slot, and transmitting one of the plurality of second private-chain packets in an idle time of the second transmission slot.

In an embodiment of the present disclosure, the Bluetooth communication device further comprises: a package control unit, used for controlling the package unit of standard Bluetooth packet to construct the plurality of second-standard Bluetooth packets; a signal modulation unit, used for determining, before transmitting each of the plurality of second private-chain packets, a signal modulation mode of each of the plurality of second private-chain packets based on a type of one corresponding second-standard Bluetooth packet, and a re-transmission detection unit, used for decoding one of the plurality of first private-chain packets in a first transmission slot to obtain a first signal data, performing a re-transmission detection on the first signal data to obtain a detection result, adding the detection result into one of the plurality of second private-chain packet that is transmitted in a second transmission slot, so that the second terminal of the device obtains the detection result after decoding the second private-chain packet, and determines whether or not to re-transmit the first private-chain packet in an idle time of a third transmission slot.

A fifth aspect of the present disclosure provides a Bluetooth communication system, comprising: a first collection device, used for collecting a first signal data and transmitting the first signal data to a first Bluetooth communication device; a second collection device, used for collecting a second signal data and transmitting the second signal data to a second Bluetooth communication device; a first Bluetooth communication device, configured to be the Bluetooth communication device according to the third aspect of the present disclosure, and to be used for transmitting the first signal data to the second Bluetooth communication device; and a second Bluetooth communication device, configured to be the Bluetooth communication device according to the fourth aspect of the present disclosure, and to be used for transmitting the second signal data to the first Bluetooth communication device.

As described above, the present disclosure constructs the signal data into a plurality of private-chain packets and transmits each of the plurality of private-chain packets in the idle time of one transmission slot in which one corresponding standard Bluetooth packet is transmitted, so that the receiving terminal can obtain the signal data based on the received private-chain packets, thereby fully utilizing idle time for signal transmission and reducing signal delay in the communication process.

BRIEF DESCRIPTION OF THE DRAWINGS

FIG. 3 shows a flowchart of another Bluetooth communication method according to an embodiment of the present disclosure;

Figure 6:
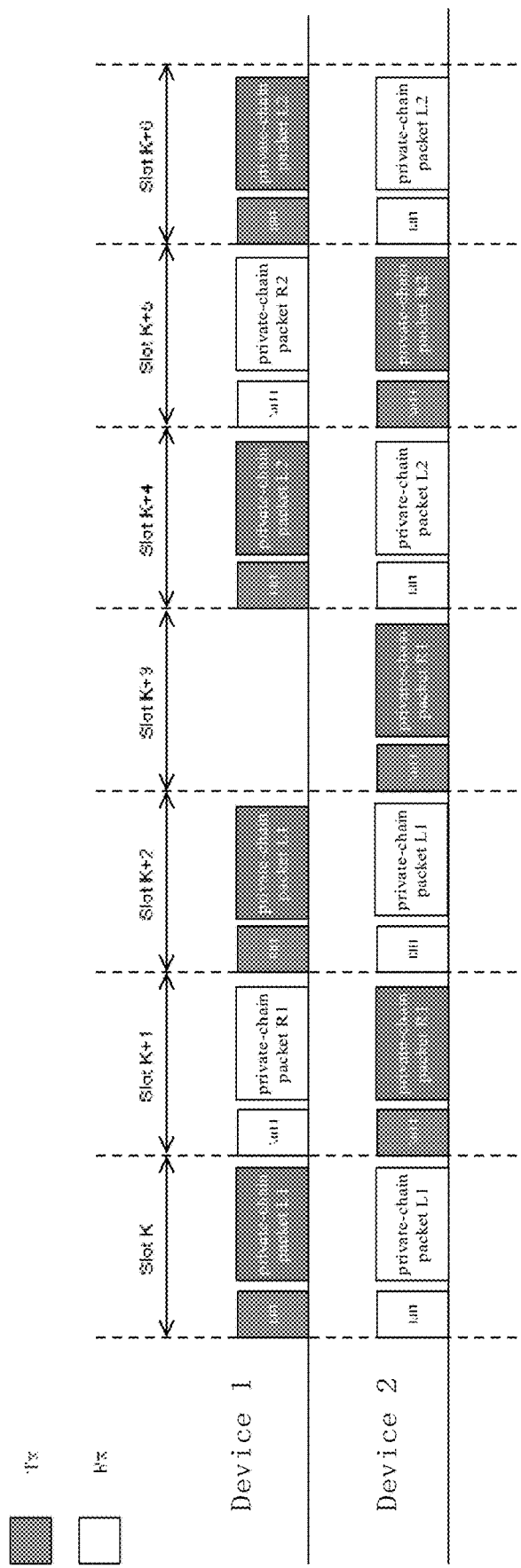
Figure 7:
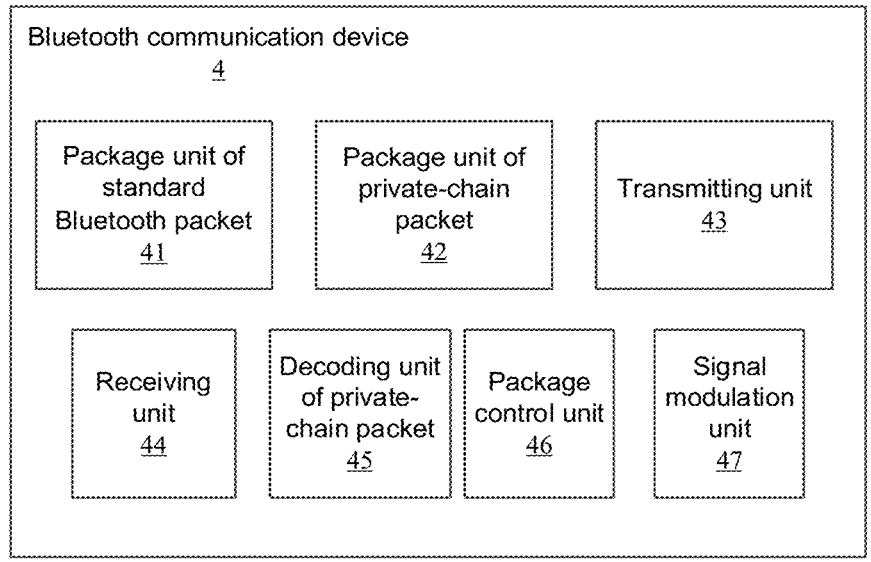
Figure 8:
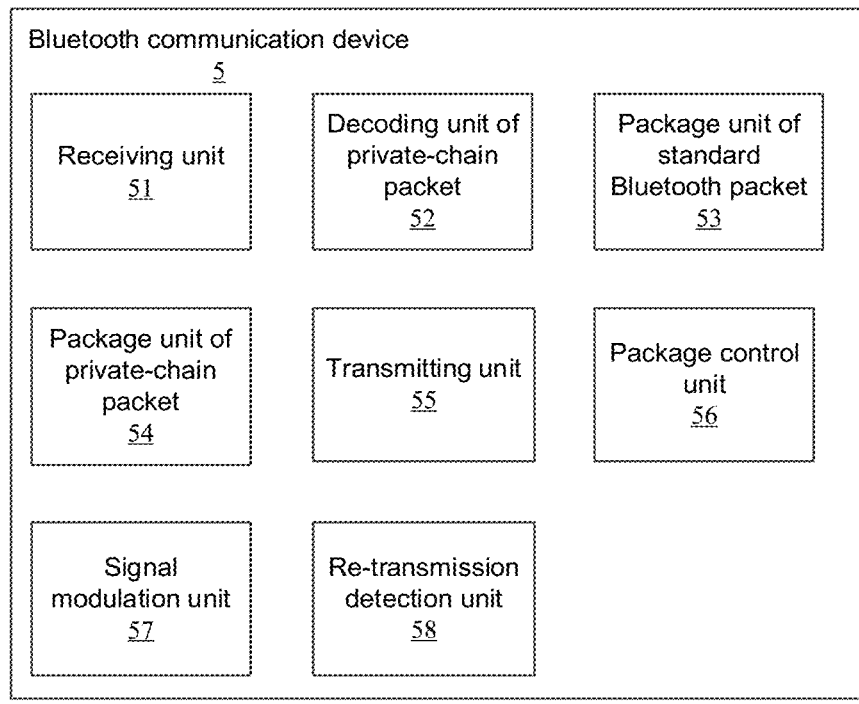
Figure 9:
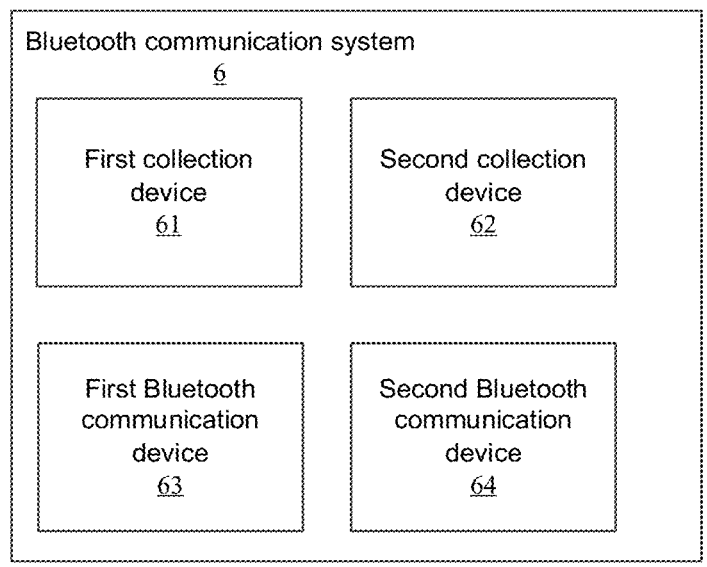

by using the another Bluetooth communication method according to an embodiment of the present disclosure;

FIG. 6 shows a schematic diagram that illustrates a master-slave device interaction (retransmission detection 2) by using the another Bluetooth communication method according to an embodiment of the present disclosure;

FIG. 7 shows a schematic diagram of a Bluetooth communication device according to an embodiment of the present disclosure;

FIG. 8 shows a schematic diagram of another Bluetooth communication device according to an embodiment of the present disclosure;

FIG. 9 shows a schematic diagram of a Bluetooth communication system according to an embodiment of the present disclosure.

DETAILED DESCRIPTION

The embodiments of the present disclosure will be described below according to the following specific examples. Those skilled can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the components' layout may also be more complicated.

Embodiment 1

The present disclosure provides a Bluetooth communication method in Embodiment 1. The Bluetooth communication method is used for unidirectional signal data transmission between a master device and a slave device. Specifically, the signal data is transmitted from the master device to the slave device, or from the slave device to the master device. A point-to-point link connection is established between the master device and the slave device based on a standard Bluetooth protocol and a customized Bluetooth protocol. The customized Bluetooth protocol comprises a customized packaging rule and a customized unpacking rule.

In one embodiment, the master device and the slave device are both Bluetooth devices, and both include a customized packaging unit and a customized unpacking unit. Specifically, the customized packaging unit performs a compression encoding on the signal data based on the customized packaging rule to obtain a corresponding private-chain packet, and the customized unpacking unit performs a decoding on the private-chain packet based on the customized unpacking rule to obtain the corresponding signal data.

Figure 1:
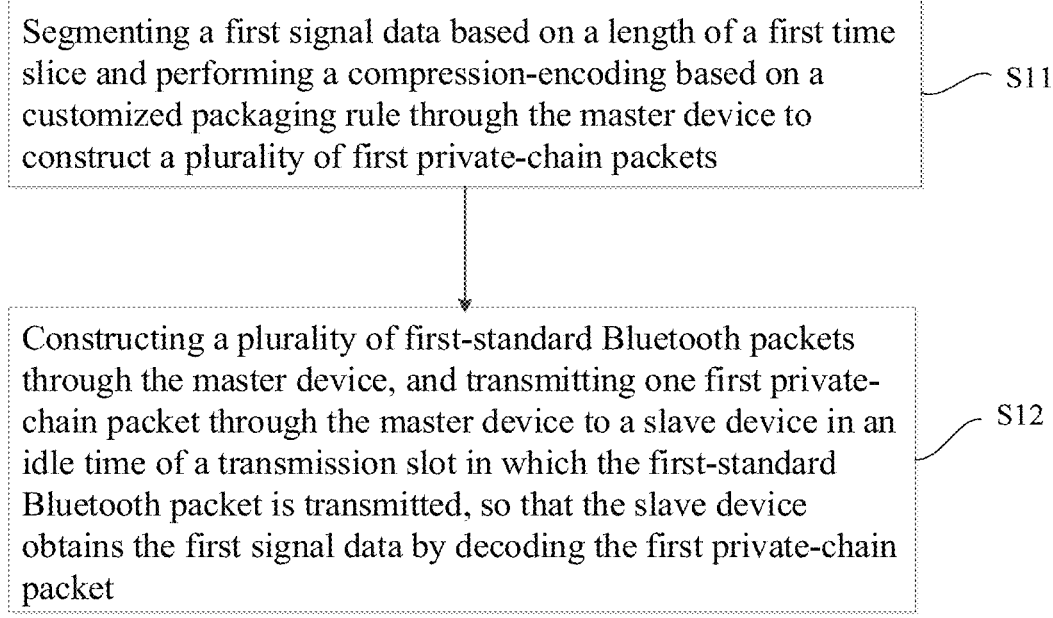
FIG. 1 shows a flowchart of a Bluetooth communication method according to an embodiment of the present disclosure.

FIG. 1 shows a flowchart of a Bluetooth communication method according to an embodiment of the present disclosure, which is applied to the master device. As shown in FIG. 1, the Bluetooth communication method comprises the following steps:

step S11: segmenting a first signal data based on a length of a first time slice and performing a compression-encoding based on a customized packaging rule through the master device to construct a plurality of first private-chain packets.

Specifically, the first time slice is a duration for a single transmission of the first signal data through the master device, and is determined by the customized Bluetooth protocol. Optionally, the first time slice may comprise n slots.

In a specific embodiment, n is two, so as to increase the transmission frequency and reduce signal delay in a single transmission.

In another specific embodiment, n is four or six, so as to increase the bandwidth of signal transmission, thereby increasing a transmission amount of the first signal data per unit of time.

As an example, the first time slice comprises two slots. When each of the slots is 625 us, the first time slice is 1.25 ms.

Specifically, the master device segments the first signal data based on the length of the first time slice and performs the compression-encoding, and then according to an assembly mode of each part of data packets involved in the customized packaging rule to construct the corresponding first private-chain packets arranged in time sequence. The corresponding first private-chain packets are transmitted to a transmitting unit through a hardware channel for transmission.

It should be noted that the specific packaging mode involved in the customized packaging rule may be the same as the standard Bluetooth protocol or may be different from the standard Bluetooth protocol.

step S12: constructing a plurality of first-standard Bluetooth packets through the master device, and transmitting one first private-chain packet through the master device to a slave device in an idle time of a transmission slot in which the first-standard Bluetooth packet is transmitted, so that the slave device obtains the first signal data by decoding the first private-chain packet.

Specifically, the transmission slot is a data sending window for the master device to unidirectionally transmit the signal data in the link. Optionally, a duration of the transmission slot is equal to that of the first time slice, and one first private-chain packet corresponds to one transmission slot. When the master device transmits one first-standard Bluetooth packet in a transmission slot, a first private-chain packet corresponding to the transmission slot will also be transmitted by the master device in an idle time of the transmission slot.

The type of the first-standard Bluetooth packet is determined by the length of the first time slice, and a duration for transmitting one first-standard Bluetooth packet is not greater than the length of the first time slice.

Specifically, the master device determines the type of the first-standard Bluetooth packet based on the number of slots of the first time slice. As an example, when the first time slice has two slots, the first-standard Bluetooth packet only occupies one slot. When the first time slice has four slots, the first-standard Bluetooth packet occupies three slots.

It should be noted that a method for determining the type of the first-standard Bluetooth packet further comprises: determining the type of the first-standard Bluetooth packet based on the standard Bluetooth protocol through the master device. When the master device connects to the slave device, the type of the first-standard Bluetooth packet that is allowed for transmission in the link is determined by the standard Bluetooth protocol, such that the type of the first-standard Bluetooth packet is determined by the standard Bluetooth protocol. As an example, when a command interaction is required by the link, a first-standard Bluetooth packet corresponding to a current transmission slot is determined to be a command Bluetooth packet DM1.

Further, the master device selects the first-standard Bluetooth packet with a smaller payload, so as to ensure that each transmission slot has a relative long idle time for transmitting a private-chain packet, thereby reducing communication delay. In one embodiment, the type of the first-standard Bluetooth packet includes but is not limited to DH, DM1, Poll and Null packet, as well as other Bluetooth packets with a smaller payload. As an example, when the first time slice has two slots, the first-standard Bluetooth packet transmitted by the master device is a DH1 packet with a payload of 0 or 1 Byte. The DH1 packet has a relative small payload and no Forward Error Correction (FEC) coding, and thus results in a long idle time for transmitting the private-chain packet. As an example, when the first time slice has four slots, the first-standard Bluetooth packet transmitted by the master device is a DH3 packet.

In order to improve the real-time performance of signal data transmission and reduce communication delay, the master device further comprises a package unit of the first private-chain packet, which is independent of a package unit of the first-standard Bluetooth packet. The package unit of the first private-chain packet and the package unit of the first-standard Bluetooth packet may be the same or different from each other. When executing step S11, the Bluetooth communication method of the present disclosure further comprises: constructing, in a transmission slot, a first private-chain packet corresponding to the transmission slot based on the customized Bluetooth protocol and the package unit of the first private-chain packet, and transmitting the first private-chain packet through a transmitting unit of the master device in an idle time of the transmission slot. In the existing technology, Bluetooth packets are packaged based on the standard Bluetooth protocol and the traditional package unit of standard Bluetooth packet, which requires the master device to start scheduling preparation at least two slots in advance. While in the present disclosure, each first private-chain packet is constructed for the corresponding transmission slot based on the customized Bluetooth protocol and the package unit of the first private-chain packet, thereby avoiding communication delay caused by early scheduling and packaging.

To further increase a usage frequency of the idle time and reduce communication delay, the master device, when connecting to the slave device, constructs and transmits one first-standard Bluetooth packet in each transmission slot, so as to ensure that both a first-standard Bluetooth packet and a first private-chain packet are transmitted in each transmission slot.

In an embodiment, information data used for constructing the first-standard Bluetooth packet is in a form of array, and the information data can be any data. The information data is packaged into the first-standard Bluetooth packet based on the standard Bluetooth protocol.

In order to ensure that one first-standard Bluetooth packet can be transmitted in each transmission slot, the master device generates and inputs the information data into the array, and a depth of the array is greater than a payload of a single first-standard Bluetooth packet at any time. The master device splits the array and forms several first-standard Bluetooth packets of the same type, and then transmits them through the transmitting unit, so that each of the first-standard Bluetooth packets can be transmitted in one transmission slot.

In one embodiment, the Bluetooth communication method further comprises:
when executing step S12, determining a modulation mode of the first private-chain packet based on a type of a first-standard Bluetooth packet which is transmitted in the same transmission slot as the first private-chain packet, and transmitting the first private-chain packet based on the modulation mode.

Specifically, the master device determines, before transmitting the first private-chain packet, the modulation mode of the first private-chain packet based on the type of the first-standard Bluetooth packet which is transmitted in the same transmission slot as the first private-chain packet, so as to speed up the signal data transmission and further reduce communication delay.

In a specific embodiment, the first-standard Bluetooth packets are those with few slots, such as DH1/DM1/null packet. The lengths of idle time of the transmission slots used for transmitting the first private-chain packets are substantially the same and relatively short, so the first private-chain packets, that are transmitted in the same transmission slots as the first-standard Bluetooth packets, are modulated by utilizing the same modulation mode as the first-standard Bluetooth packet to simplify the Bluetooth communication scheme.

In another specific embodiment, the first-standard Bluetooth packets are those with multiple slots, such as DH3/DH5 packet. The lengths of idle time used for transmitting the first private-chain packets are relatively long, and the first private-chain packets, that are transmitted in the same transmission slots as the first-standard Bluetooth packets, are modulated by utilizing a modulation mode with better anti-interference, such as a Gaussian Frequency-Shift Keying (GFSK) modulation mode, so as to increase the transmission rate and reduce communication delay. When the interaction between the master device and the slave device interact includes a command Bluetooth packet, such as DM1 packet, the lengths of idle time used for transmitting the first private-chain packets are short, therefore the first private-chain packets, corresponding to the same transmission slots as the command Bluetooth packets, are modulated by utilizing a modulation mode with a higher adjustment density, such as a Pi/4 Differential Phase Shift Keying ($\pi$/4DPSK) or 8-Differential Phase Shift Keying (8DPSK) modulation mode, so as to ensure continuous data transmission, increase transmission rate, and reduce communication delay.

In one embodiment, to modulate the first private-chain packet with a higher-efficiency modulation mode, reduce the replacement of modulation mode in the idle time, and thus lengthen the idle time, the Bluetooth communication method further comprises: reducing a transmission frequency of a command Bluetooth packet in the link when constructing the first-standard Bluetooth packet.

As an example, the transmission frequency of the command Bluetooth packets in the link is controlled by turning off or reducing adaptive frequency hopping, turning off power control, and other control methods.

In one embodiment, the Bluetooth communication method further comprises:
when executing step S22, determining a data compression mode of the first private-chain packet based on the type of the first-standard Bluetooth packet which is transmitted in the same slot as the first private-chain packet.

Specifically, the master device determines, before transmitting the first-standard Bluetooth packet, a data compression mode of the first signal data corresponding to the first private-chain packet based on the type of the first-standard Bluetooth packet, wherein the first-standard Bluetooth packet is transmitted in the same transmission slot as the first private-chain packet, so as to ensure that when an amount of the first signal data to be transmitted in a certain slot is large, the payload of the first private-chain packet can be shortened by increasing the data compression rate, thereby ensuring the real-time performance of signal data transmission and reducing communication delay.

The slave device receives the first-standard Bluetooth packet and the first private-chain packet, and decodes the first private-chain packet based on the customized unpacking rule, so as to obtain the first signal data.

Figure 2:
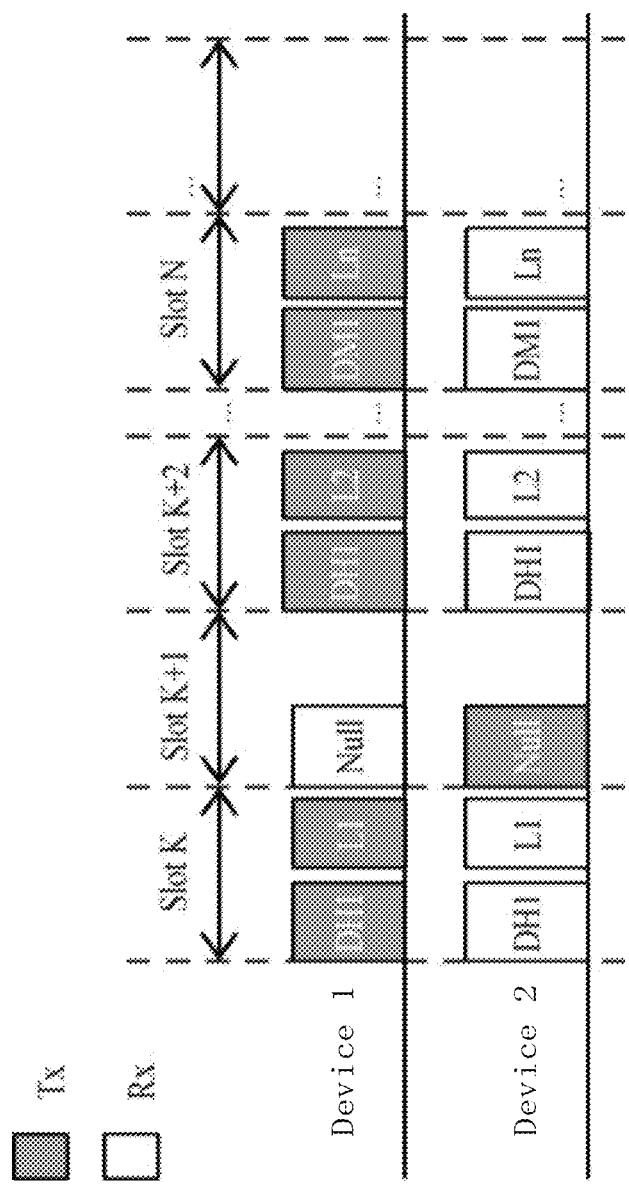
FIG. 2 shows a schematic diagram that illustrates a master-slave device interaction (unidirectional communication) by using the Bluetooth communication method according to an embodiment of the present disclosure.

The slave device transmits or not, based on the first-standard Bluetooth packet received in the transmission slot, a second-standard Bluetooth packet corresponding to the first-standard Bluetooth packet in a receiving slot between two adjacent transmission slots. As an example shown in FIG. 2, the master device (device 1) transmits one first-standard Bluetooth packet (DH1 packet) in slot K, and the slave device (device 2) replies with a second-standard Bluetooth packet (NULL packet) corresponding to the first-standard Bluetooth packet in slot K+1, or does not reply with any content.

It should be noted that the Bluetooth communication method according to the present disclosure is not only applicable to the master device, but also to the slave device. When the slave device executes the Bluetooth communication method and acts as an implementing subject, the slave device is a sending terminal, and the master device is a receiving terminal.

Embodiment 2

The present disclosure provides another Bluetooth communication method in Embodiment 2. The Bluetooth communication method is used for bidirectional signal data transmission between a master device and a slave device. Specifically, a first signal data is transmitted from the master device to the slave device, at which time a second signal data is transmitted from the slave device to the master device.

Specifically, the second signal data is data that transmitted from the slave device to the master device.

FIG. 3 shows a flowchart of another Bluetooth communication method according to an embodiment of the present disclosure. As shown in FIG. 3, the Bluetooth communication method comprises the following steps:
step S21: segmenting a first signal data based on a length of a first time slice and performing a compression-encoding based on a customized packaging rule through a master device to construct a plurality of first private-chain packets; and the slave device segmenting a second signal data based on a length of a second time slice and performing a compression-encoding based on the customized packaging rule through a slave device to construct a plurality of second private-chain packets.

Specifically, the first time slice is a duration for a single transmission of the first signal data through the master device, and the second time slice is a duration for a single transmission of the second signal data through the slave device. The first and second time slices are preset in the customized Bluetooth protocol, and have the same length.

Specifically, when the master device and the slave device adopt classic Bluetooth transmission, the first and second time slices both include n slots, and n may be selected from two, six, and ten.

In a specific embodiment, n is two, so as to increase the transmission frequency and reduce signal delay in a single transmission.

In another specific embodiment, n is six or ten, so as to increase a transmission amount of the signal data in a single transmission.

step S22: transmitting one first-standard Bluetooth packet in a first transmission slot through the master device, and transmitting one first private-chain packet through the master device to the slave device in an idle time of the first transmission slot in which the first-standard Bluetooth packet is transmitted, so that the slave device obtains the first signal data based on the first private-chain packet; constructing and transmitting a second-standard Bluetooth packet through the slave device in a second transmission slot, and transmitting one second private-chain packet through the slave device in an idle time of the second transmission slot in which the second-standard Bluetooth packet is transmitted, after the slave device receives the first-standard Bluetooth packet, so that the master device obtains the second signal data based on the second private-chain packet.

Specifically, the implementation for the master device to transmit the first-standard Bluetooth packet in the transmission slot and to transmit the first private-chain packet in the idle time, which is based on the standard Bluetooth protocol, is the same as that in Embodiment 1.

When the first-standard Bluetooth packet is not a command Bluetooth packet, the slave device constructs a second-standard Bluetooth packet based on both the standard Bluetooth protocol and the length of the second time slice.

As an example, when the first time slice has two slots, the first-standard Bluetooth packet is the one that only occupies one slot. When the first time slice has six slots, the first-standard Bluetooth packet is the one that occupies three slots.

It should be noted that when the first-standard Bluetooth packet is a command Bluetooth packet, the slave device determines, after receiving the first-standard Bluetooth packet in the current transmission slot, a type of a second-standard Bluetooth packet corresponding to the first-standard Bluetooth packet based on both the standard Bluetooth protocol and the length of the second time slice. The slave device transmits the second-standard Bluetooth packet in the next transmission slot, and transmits the corresponding second private-chain packet in the idle time of the next transmission slot in which the second-standard Bluetooth packet is transmitted.

Figure 4:
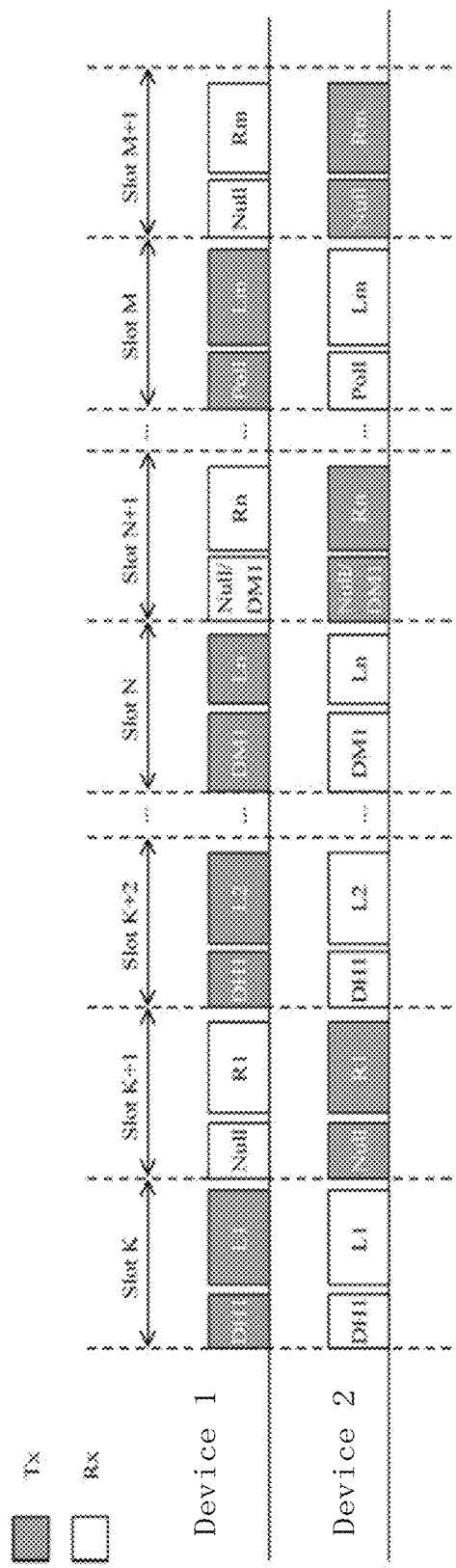
FIG. 4 shows a schematic diagram that illustrates a master-slave device interaction (bidirectional communication) by using the another Bluetooth communication method according to an embodiment of the present disclosure.

As an example, when there are no requirements on command packet interaction and packet insertion in a link, the master device (device 1) transmits one first-standard Bluetooth packet (DH1 packet) to the slave device (device 2) in slot K, and transmits a first private-chain packet L1 in the idle time of slot K. In slot K, the slave device determines that a second-standard Bluetooth packet for replying is a Null packet based on the DH1 packet, and decodes the L1 packet. In slot K+1, the slave device (device 2) replies the master device (device 1) with the Null packet, and transmits a second private-chain packet R1 to the master device (device 1) in the idle time of slot K+1, as shown in FIG. 4.

As an example, when there is command packet interaction requirement in the link, the master device (device 1) transmits one first-standard Bluetooth packet (DM1 packet) to the slave device (device 2) in slot N, and transmits a first private-chain packet Ln in the idle time of slot N. In slot N, the slave device (device 2) determines that a second-standard Bluetooth packet for replying is a Null or DM1 packet based on the DM1 packet, and decodes the Ln packet. In slot N+1, the slave device (device 2) replies the master device (device 1) with the Null or DM1 packet, and transmits a second private-chain packet Rn to the master device (device 1) in the idle time of slot N+1, as shown in FIG. 4.

In one embodiment, the Bluetooth communication method further comprises:

when executing step S22, determining a modulation mod of the private-chain packet based on a type of a standard Bluetooth packet which is transmitted in the same transmission slot as the private-chain packet.

Specifically, the master device determines, before transmitting the first private-chain packet, the modulation mode of the first private-chain packet based on the type of the first-standard Bluetooth packet which is transmitted in the same transmission slot as the first private-chain packet; and the slave device determines, before transmitting the second private-chain packet, the modulation mode of the second private-chain packet based on the type of the second-standard Bluetooth packet which is transmitted in the same transmission slot as the second private-chain packet, so as to speed up the signal data transmission and further reduce communication delay.

In a specific embodiment, the first/second standard Bluetooth packets are those with few slots, such as DH1/DM1/null packet. The lengths of idle time used for transmitting the private-chain packets are substantially the same and relatively short, so the first/second private-chain packets, that are transmitted in the same transmission slot as the first/second-standard Bluetooth packets, are modulated by utilizing the same modulation mode as the first/second standard Bluetooth packet to simplify the Bluetooth communication scheme.

In another specific embodiment, the first/second standard Bluetooth packets are those with multiple slots, such as DH3/DH5 packet. The lengths of idle time used for transmitting the private-chain packets are relatively long, and the private-chain packets, that are transmitted in the same transmission slots as the first/second standard Bluetooth packets, are modulated by utilizing a modulation mode with better anti-interference, such as a GFSK modulation mode. When the interaction between the master device and the slave device includes a command Bluetooth packet, such as DM1 packet, the lengths of idle time used for transmitting the private-chain packets are short, therefore the first/second private-chain packets, corresponding to the same transmission slots as the command Bluetooth packets, are modulated by utilizing a modulation mode with a higher adjustment density, such as a $\pi/4$DPSK or 8DPSK modulation mode, so as to ensure continuous data transmission, increase transmission rate, and reduce communication delay.

In one embodiment, the Bluetooth communication method further comprises:

when executing step S22, determining a data compression mode of the first private-chain packet based on a type of a first-standard Bluetooth packet which is transmitted in the same transmission slot as the first private-chain packet.

Specifically, the master device determines, before transmitting the first private-chain packet, a data compression mode of the first signal data corresponding to the first private-chain packet based on the type of the first-standard Bluetooth packet, wherein the first-standard Bluetooth packet is transmitted in the same transmission slot as the first private-chain packet; and the slave device determines, before transmitting the second private-chain packet, a data compression mode of the second signal data corresponding to the second private-chain packet based on the type of the second-standard Bluetooth packet, wherein the first-standard Bluetooth packet is transmitted in the same transmission slot as the second private-chain packet. Thus, when an amount of the signal data to be transmitted in a certain slot is large, the time occupied by the private-chain packet can be shortened by increasing the data compression rate, thereby ensuring the real-time performance of signal data transmission and reducing communication delay.

Embodiment 3

The present disclosure provides another Bluetooth communication method in Embodiment 3. The Bluetooth communication method is used for bidirectional signal data transmission between a master device and a slave device.

The steps of the Bluetooth communication method in Embodiment 3 are substantially the same as those in Embodiment 2, except that the Bluetooth communication method of Embodiment 3 further comprises: performing a retransmission-detection on one private-chain packet and performing a retransmission during a bidirectional signal data transmission between the master device and the slave device.

Specifically, the differences are as follows:

when executing step S22, the Bluetooth communication method of Embodiment 3 further comprises: after receiving and decoding one first private-chain packet in a first transmission slot to obtain a first signal data, performing a retransmission-detection on the first signal data through the slave device to obtain a detection result, and adding the detection result into a second private-chain packet corresponding to a second transmission slot, so that the master device obtains the detection result after decoding the second private-chain packet, and determines whether or not to re-transmit the first private-chain packet in an idle time of a third transmission slot; and/or after receiving and decoding one second private-chain packet in a first transmission slot to obtain a second signal data, performing a retransmission-detection on the second signal data through the master device to obtain a detection result, and adding the detection result into a first private-chain packet corresponding to a second transmission slot, so that the slave device obtains the detection result after decoding the first private-chain packet, and determines whether or not to re-transmit the second private-chain packet in an idle time of a third transmission slot.

Specifically, the detection result includes: one that needs to be re-transmitted or not need to be re-transmitted.

Figure 5:
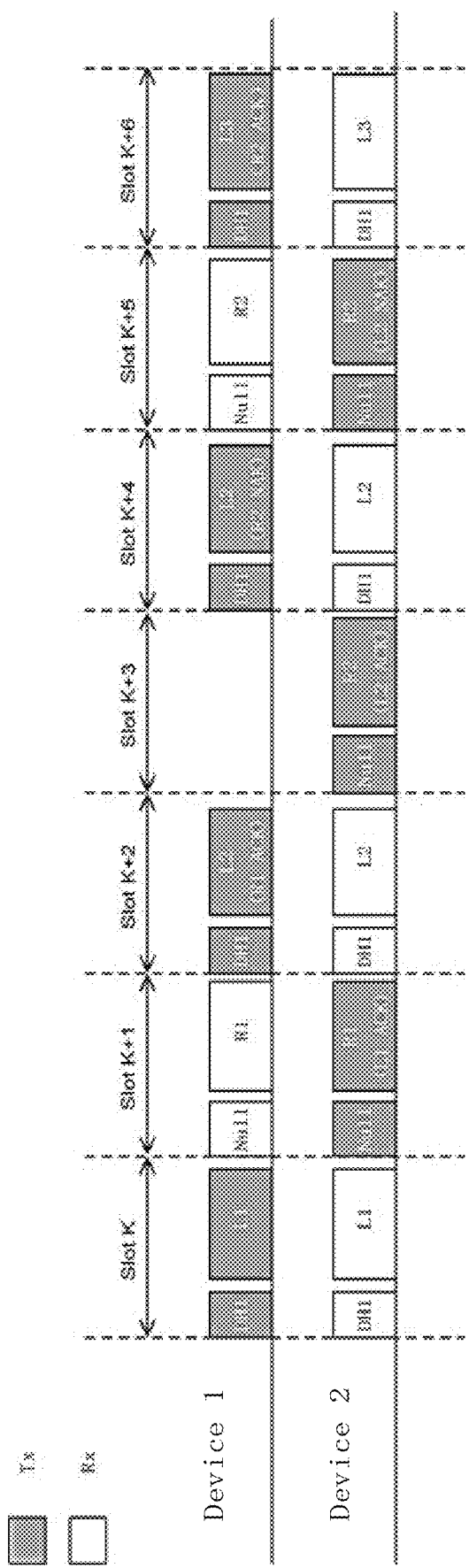
FIG. 5 shows a schematic diagram that illustrates a master-slave device interaction (retransmission detection 1)

FIG. 5 shows a schematic diagram that illustrates the master-slave interaction by adopting another Bluetooth communication method according to an embodiment of the present disclosure. The detection result that one needs to be re-transmitted is represented as NAK, and the detection result that one does not need to be re-transmitted is represented as ACK.

As shown in FIG. 5, in slot K+1, the slave device (device 2) transmits a second private-chain packet R1 to the master device (device 1), and the second private-chain packet R1 comprises a first detection result that indicates whether a first private-chain packet L1 received in slot K by the slave device needs to be re-transmitted. Here, the first detection result is ACK, which means that the first private-chain packet L1 does not need to be re-transmitted. After receiving and decoding the second private-chain packet R1 in slot K+1 to obtain the first detection result, the master device performs the retransmission-detection on the second private-chain packet R1 to obtain a second detection result, adds the second detection result into a first private-chain packet L2, and transmits the first private-chain packet L2 to the slave device. In slot K+2, the slave device receives and decodes the first private-chain packet L2 to obtain the second detection result, and performs the retransmission-detection on the first private-chain packet L2 to obtain a new first detection result. In slot K+3, the above processes are repeated.

As shown in FIG. 5, in slot K+3, the master device loses a second-standard Bluetooth packet and a second private-chain packet R2 that both are transmitted from the slave device in slot K+2, and in slot K+4, the master device transmits a new first private-chain packet L2 with a first detection result NAK indicating that the second private-chain packet R2 needs to be re-transmitted. The slave device re-transmits the second private-chain packet R2 in slot K+5, that is, the second private-chain packet R2 transmitted from the slave device in slot K+2 is re-transmitted to the master device in slot K+5.

In other embodiments, it should be noted that the Bluetooth communication method comprises another retransmission-detection with a fixed time of re-transmission. Preferably, the times of re-transmission is no more than two.

As shown in FIG. 6, the master device transmits a first private-chain packet L1 to the slave device in slots K and K+2. During these two transmissions, the signal data corresponding to the first private-chain packet L1 will be adopted as long as it is received correctly at least once. If the signal data corresponding to the first private-chain packet L1 fails to be received correctly twice, the first private-chain packet L1 will be discarded.

In one embodiment, during the master-slave device interaction, by performing the retransmission-detection on the private-chain packets and re-transmitting the private-chain packets when needed, the packet loss rate can be reduced and the communication quality can be improved in a high-interference and poor-interaction environment.

Embodiment 4

The present disclosure provides a Bluetooth communication device. The Bluetooth communication device is used for a point-to-point link, and the link is constructed based on a standard Bluetooth protocol and a customized Bluetooth protocol.

Specifically, the customized Bluetooth protocol comprises a customized packaging rule and an unpacking rule. The customized packaging rule is used for performing a compression-encoding process on signal data to construct a corresponding private-chain packet. The customized unpacking rule is used for decoding the private-chain packet to obtain the corresponding signal data.

As shown in FIG. 7, the Bluetooth communication device 4 comprises:
- a package unit of standard Bluetooth packet 41, used for constructing a plurality of first-standard Bluetooth packets and transmitting the first-standard Bluetooth packets to a transmitting unit;
- a package unit of private-chain packet 42, used for segmenting a first signal data based on a length of a first time slice, performing a compression-encoding to construct a plurality of first private-chain packets based on a customized packaging rule, and transmitting the plurality of first private-chain packets to the transmitting unit; and
- the transmitting unit 43, used for transmitting the plurality of first-standard Bluetooth packets and the plurality of first private-chain packets, wherein each of the plurality of first private-chain packets is transmitted in an idle time of the transmission slot in which the corresponding first-standard Bluetooth packet is transmitted.

The Bluetooth communication device 4 further comprises a receiving unit 44 and a decoding unit of private-chain packet 45.

Specifically, the receiving unit 44 is used for receiving the second-standard Bluetooth packet transmitted by a second terminal of device of the link, and receiving the second private-chain packet that are transmitted by the second terminal of device in an idle time of a transmission slot in which the second-standard Bluetooth packet is transmitted.

The decoding unit of private-chain packet 45 is used for decoding the second private-chain packet to obtain a corresponding second signal data.

The Bluetooth communication device 4 further comprises a package control unit 46 and a signal modulation unit 47.

Specifically, the package control unit 46 is used for controlling the package unit of standard Bluetooth packet to construct the first-standard Bluetooth packet corresponds to the transmission slot.

In one embodiment, information data used for constructing the first-standard Bluetooth packet is in a form of array, and the information data can be any data. In order to ensure that one first-standard Bluetooth packet is transmitted in each transmission slot, the package control unit 46 generates and inputs the information data into the array, and a depth of the array is greater than a payload of a single first-standard Bluetooth packet at any time, so that the information data can be packaged, based on the standard Bluetooth protocol, to form the first-standard Bluetooth packet by the package unit of standard Bluetooth packet 41. The first-standard Bluetooth packet is transmitted by the transmitting unit to ensure that one first-standard Bluetooth packet is transmitted in each transmission slot.

The signal modulation unit 47 is used for determining, before transmitting a first private-chain packet, a signal modulation mode of the first private-chain packet based on a type of a first-standard Bluetooth packet that is transmitted in the same transmission slot as the first private-chain packet.

Specifically, the implementation method for determining the signal modulation mode of the first private-chain packet based on the type of the first-standard Bluetooth packet that is transmitted in the same transmission slot as the first private-chain packet is the same as that of Embodiment 1, which will not be repeated.

In one embodiment, all units of the Bluetooth communication device collaboratively perform the Bluetooth communication method as described above in Embodiment 1, and transmit the first signal data to the second terminal of device of the link by constructing the first private-chain packet, thereby ensuring the real-time performance of signal data transmission and reducing communication delay.

Embodiment 5

The present disclosure provides another Bluetooth communication device. The Bluetooth communication device is used for a point-to-point link with bidirectional communication, and the link is constructed based on a standard Bluetooth protocol and a customized Bluetooth protocol.

As shown in FIG. 8, the Bluetooth communication device 5 comprises:

- a receiving unit 51, used for receiving a first-standard Bluetooth packet transmitted by a second terminal of device of a link, and receiving a first private-chain packet that is transmitted by the second terminal of device in an idle time of a transmission slot in which the first-standard Bluetooth packet is transmitted;
- a decoding unit of private-chain packet 52, used for decoding, based on a customized unpacking rule, the first private-chain packet to obtain a corresponding first signal data;
- a package unit of standard Bluetooth packet 53, used for constructing, based on the first-standard Bluetooth packet, a corresponding second-standard Bluetooth packet and transmitting the second-standard Bluetooth packet to a transmitting unit;
- a package unit of private-chain packet 54, used for segmenting a second signal data based on a length of a second time slice, performing a compression-encoding process to construct a second private-chain packet based on a customized packaging rule, and transmitting the second private-chain packet to a transmitting unit, wherein the length of the second time slice equals to a length of a first time slice, in which the second terminal of device constructs the first private-chain packet;
- the transmitting unit 55, used for transmitting, after receiving one first-standard Bluetooth packet in a current transmission slot, a second-standard Bluetooth packet in a next transmission slot, and transmitting a corresponding second private-chain packet in an idle time of the next transmission slot.

The Bluetooth communication device further comprises:
a package control unit 56, used for controlling the package unit of standard Bluetooth packet to construct one first-standard Bluetooth packet in each transmission slot.

The implementation method for controlling the package unit of standard Bluetooth packet to construct one first-standard Bluetooth packets in each transmission slot is the same as that of Embodiment 1, which will not be repeated.

The Bluetooth communication device further comprises: a signal modulation unit 57, used for determining, before transmitting the first private-chain packet, a signal modulation mode of the first private-chain packet based on a type of a first-standard Bluetooth packet that is transmitted in the same transmission slot as the first private-chain packet.

The implementation method for determining the signal modulation mode of the first private-chain packet based on the type of the first-standard Bluetooth packet that is transmitted in the same transmission slot as the first private-chain packet is the same as that of Embodiment 1, which will not be repeated.

The Bluetooth communication device further comprises: a re-transmission detection unit 58, used for performing a retransmission detection on the first signal data which is obtained by decoding the first private-chain packet in a first transmission slot, to obtain a detection result, adding the detection result into the second private-chain packet corresponding to a second transmission slot, so that the second terminal of device obtains the detection result after decoding the second private-chain packet and determines whether or not to re-transmit the first private-chain packet in an idle time of a third transmission slot.

The implementation method for the re-transmission detection unit is the same as that of Embodiment 3, which will not be repeated.

Embodiment 6

The present disclosure provides a Bluetooth communication system used for a point-to-point link with bidirectional communication, and the link is constructed based on a standard Bluetooth protocol and a customized Bluetooth protocol.

As shown in FIG. 9, the Bluetooth communication system 6 comprises a first collection device 61, a second collection device 62, a first Bluetooth communication device 63, and a second Bluetooth communication device 64.

Specifically, the first Bluetooth communication device 63 and the second Bluetooth communication device 64 correspond to a master device and a slave device, respectively, and construct the point-to-point link based on the standard Bluetooth protocol and the customized Bluetooth protocol.

The first collection device 61 is connected to the first Bluetooth communication device 63 for collecting a first signal data and outputting the first signal data to the first Bluetooth communication device 63. The second collection device 62 is connected to the second Bluetooth communication device 64 for collecting a second signal data and outputting the second signal data to the second Bluetooth communication device 64. The first signal data and the second signal data may include audio data, video data, or other data that require high real-time transmission.

In a specific embodiment, the first Bluetooth communication device is configured to be a Bluetooth communication device as described in Embodiment 4, and the second Bluetooth communication device is configured to be a Bluetooth communication device as described in Embodiment 5, so as to realize the interaction therebetween.

In summary, the Bluetooth communication method, the Bluetooth communication device, and the Bluetooth communication system of the present disclosure construct signal data to be transmitted into a plurality of private-chain packets, transmit one private-chain packet in an idle time of a transmission slot in which a standard Bluetooth packet is also transmitted. This allows a receiving terminal to obtain the signal data by decoding the corresponding private-chain packet, thereby taking full advantage of the idle time for signal data transmission and reducing signal delay during communication. By directly packaging the private-chain packet through an independent package unit of private-chain packet, the method of the present disclosure can avoid the data packet scheduling delay that exists in conventional Bluetooth scheduling, thereby further improving signal transmission efficiency and reducing communication delay. In addition, the method of the present disclosure can also fully utilize the existing and widely used standard Bluetooth protocol without establishing a completely new set of Bluetooth protocol. This not only saves development costs and improves development efficiency but also makes the method more adaptable and scalable.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the scope of the present disclosure.

What is claimed is:

1. A Bluetooth communication method, used for a first terminal of a device of a point-to-point link, comprising:
    segmenting a first signal data based on a length of a first time slice and performing a compression-encoding, to construct, in each of transmission slots, one of a plurality of first private-chain packets corresponding to said transmission slot based on a customized Bluetooth protocol;
    in each of the transmission slots, based on a standard Bluetooth protocol, constructing one of a plurality of first-standard Bluetooth packets corresponding to said transmission slot and transmitting said first-standard Bluetooth packets to a second terminal of the device of the link, and in an idle time of said transmission slot, transmitting the corresponding one of the plurality first private-chain packets constructed in said transmission slot, so that the second terminal of the device of the link obtains the first signal data by decoding the plurality of first private-chain packets,
    wherein before transmitting said first private-chain packet, a signal modulation mode of said first private-chain packet is determined based on a type of said first-standard Bluetooth packet constructed in the same transmission slot as said first private-chain packet.

2. The Bluetooth communication method according to claim 1, wherein the first terminal of the device comprises a package unit of the first private-chain packet, and wherein constructing the plurality of first private-chain packets comprises constructing the plurality of first private-chain packets by the package unit of the first private-chain packet.

3. The Bluetooth communication method according to claim 1, wherein an information data used for constructing the plurality of first-standard Bluetooth packets is in a form of an array, and wherein constructing the plurality of first-standard Bluetooth packets comprises: inputting the information data in the form of the array, and ensuring a depth of the array greater than a payload of each of the plurality of first-standard Bluetooth packets at any time.

4. The Bluetooth communication method according to claim 1, further comprising: reducing a transmission frequency of a command Bluetooth packet in the link while constructing the plurality of first-standard Bluetooth packets.

5. The Bluetooth communication method according to claim 1, further comprising:
    before transmitting said first private-chain packet, determining a data compression mode of said first private-chain packet based on the type of said first-standard Bluetooth packet transmitted in the same slot as said first private-chain packet.

6. The Bluetooth communication method according to claim 1,
    wherein the customized Bluetooth protocol comprises a customized packaging rule and a customized unpacking rule, and each of the first terminal of the device and the second terminal of the device in the point-to-point link comprises a customized packaging unit and a customized unpacking unit;
    wherein the customized packaging unit performs the compression-encoding on the first signal data based on a customized packaging rule to obtain a corresponding private-chain packet, and the customized unpacking unit performs a decoding on the private-chain packet based on the customized unpacking rule to obtain the first signal data.

7. A Bluetooth communication method, used for a first terminal of a device of a point-to-point link with bidirectional communication, comprising:
    receiving, in each of transmission slots, one of a plurality of first-standard Bluetooth packets transmitted by a second terminal of the device of the link, and receiving, in an idle time of said transmission slot, one of a plurality of first private-chain packets corresponding to said transmission slot transmitted by the second terminal of the device; wherein in said transmission slot, the corresponding one of the plurality of first private-chain packets is constructed based on a customized Bluetooth protocol, wherein before transmitting said first private-chain packet, the second terminal of the device determines a signal modulation mode of said first private-chain packet based on a type of said first-standard Bluetooth packet transmitted in the same transmission slot as said first private-chain packet;
    decoding, based on the customized Bluetooth protocol, the first private-chain packet by the first terminal of the device to obtain a corresponding first signal data.

8. The Bluetooth communication method according to claim 7, further comprising:
    segmenting a second signal data based on a length of a second time slice and performing a compression-encoding, to construct, in each of transmission slots, one of a plurality of second private-chain packets corresponding to said transmission slot, wherein the length of the second time slice equals to a length of a first time slice that is for the second terminal of the device to construct the plurality of first private-chain packets;
    after receiving one of the plurality of first-standard Bluetooth packets in a first transmission slot, constructing and transmitting, in a second transmission slot, one of a plurality of second-standard Bluetooth packets corresponding to said second transmission slot, and transmitting, in an idle time of said second transmission slot, one of the plurality of second private-chain packets constructed in said second transmission slot, so that the second terminal of the device obtains the second signal data after decoding the corresponding second private-chain packet.

9. The Bluetooth communication method according to claim 8, further comprising: before transmitting one of the plurality of second private-chain packets, determining, by the first terminal of the device, a signal modulation mode of the second private-chain packet based on a type of one corresponding second-standard Bluetooth packet that is transmitted in the same transmission slot as the second private-chain packet.

10. The Bluetooth communication method according to claim 8, further comprising: after decoding one of the plurality of first private-chain packets in a first transmission slot to obtain the first signal data, performing a retransmission detection on the first signal data to obtain a detection result, adding the detection result into one of the plurality of second private-chain packets that is transmitted in a second transmission slot, so that the second terminal of the device obtains the detection result after decoding the second private-chain packet, and determines whether or not to re-transmit the first private-chain packet in an idle time of a third transmission slot.

11. A Bluetooth communication device, used for a point-to-point link, comprising:

a package unit of standard Bluetooth packet, used for constructing a plurality of first-standard Bluetooth packets and transmitting each of the plurality of first-standard Bluetooth packets to a transmitting unit;

a package unit of private-chain packet, used for segmenting a first signal data based on a length of a first time slice and performing a compression-encoding, to construct, in each of transmission slots, one of a plurality of first private-chain packets corresponding to said transmission slot based on a customized Bluetooth protocol, and transmitting each of the plurality of first private-chain packets to the transmitting unit; and the transmitting unit, used for transmitting, in each of the transmission slots, one of the plurality of first-standard Bluetooth packets to a second terminal of a device of the link, and transmitting, in an idle time of said transmission slot, one of the plurality of first private-chain packets constructed in said transmission slot, wherein before transmitting said first private-chain packet, a signal modulation mode of said first private-chain packet is determined based on a type of said first-standard Bluetooth packet transmitted in the same transmission slot as said first private-chain packet.

12. The Bluetooth communication device according to claim 11, further comprising:

a receiving unit, used for receiving, in each of the transmission slots, one of a plurality of second-standard Bluetooth packets transmitted by the second terminal of the device of the link, and receiving, in an idle time of said transmission slot, one of a plurality of second private-chain packets corresponding to said transmission slot transmitted by the second terminal of the device; and a decoding unit of private-chain packet, used for decoding the plurality of second private-chain packets to obtain a corresponding second signal data.

13. The Bluetooth communication device according to claim 12, further comprising:

a package control unit, used for controlling the package unit of standard Bluetooth packet to construct the plurality of first-standard Bluetooth packets; and a signal modulation unit, used for determining, before transmitting each of the plurality of first private-chain packets, a signal modulation mode of each of the plurality of first private-chain packets based on a type of one corresponding first-standard Bluetooth packet that is transmitted in the same transmission slot as the first private-chain packet.

14. A Bluetooth communication system, comprising:

a first collection device, used for collecting a first signal data and transmitting the first signal data to a first Bluetooth communication device;

a second collection device, used for collecting a second signal data and transmitting the second signal data to a second Bluetooth communication device;

a first Bluetooth communication device, configured to be the Bluetooth communication device according to claim 12, and to be used for transmitting the first signal data to the second Bluetooth communication device; and a second Bluetooth communication device, configured to be used for transmitting the second signal data to the first Bluetooth communication device, wherein the second Bluetooth communication device comprises:

a receiving unit, used for receiving, in each of the transmission slots, one of a plurality of first-standard Bluetooth packets transmitted by a second terminal of a device of the link, and receiving, in an idle time of said transmission slot, one of a plurality of first private-chain packets corresponding to said transmission slot transmitted by the second terminal of the device; wherein said first private-chain packet is constructed based on a customized Bluetooth protocol;

a decoding unit of private-chain packet, used for decoding, based on the customized Bluetooth protocol, the plurality of first private-chain packets to obtain a corresponding first signal data;

a package unit of standard Bluetooth packet, used for constructing a plurality of second-standard Bluetooth packets and transmitting each of the plurality of second-standard Bluetooth packets to a transmitting unit;

a package unit of private-chain packet, used for segmenting a second signal data based on a length of a second time slice, performing a compression-encoding to construct a plurality of second private-chain packets, and transmitting each of the plurality of second private-chain packets to the transmitting unit, wherein the length of the second time slice equals to a length of a first time slice that is for the second terminal of the device to construct the plurality of first private-chain packets; and the transmitting unit, used for transmitting, after receiving one of the plurality of first-standard Bluetooth packets in a first transmission slot, one of the plurality of second-standard Bluetooth packets in a second transmission slot, and transmitting one of the plurality of second private-chain packets corresponding to said second transmission slot in an idle time of the second transmission slot.

15. A Bluetooth communication device, used for a point-to-point link with bidirectional communication, comprising:

a receiving unit, used for receiving, in each of transmission slots, one of a plurality of first-standard Bluetooth packets transmitted by a second terminal of a device of the link, and receiving, in an idle time of said transmission slot, one of a plurality of first private-chain packets corresponding to said transmission slot transmitted by the second terminal of the device; wherein in said transmission slot, said first private-chain packets is constructed based on a customized Bluetooth protocol, wherein before transmitting said first private-chain packet, the second terminal of the device determines a signal modulation mode of said first private-chain packet based on a type of said first-standard Bluetooth packet transmitted in the same transmission slot as said first private-chain packet; and a decoding unit of private-chain packet, used for decoding, based on the customized Bluetooth protocol, the plurality of first private-chain packets to obtain a corresponding first signal data.

16. The Bluetooth communication device according to claim 15, further comprising:

a package unit of standard Bluetooth packet, used for constructing a plurality of second-standard Bluetooth packets and transmitting each of the plurality of second-standard Bluetooth packets to a transmitting unit;

a package unit of private-chain packet, used for segmenting a second signal data based on a length of a second time slice, performing a compression-encoding to construct a plurality of second private-chain packets, and transmitting each of the plurality of second private-chain packets to the transmitting unit, wherein the length of the second time slice equals to a length of a first time slice that is for the second terminal of the device to construct the plurality of first private-chain packets;

the transmitting unit, used for transmitting, after receiving one of the plurality of first-standard Bluetooth packets in a first transmission slot, one of the plurality of second-standard Bluetooth packets in a second transmission slot, and transmitting one of the plurality of second private-chain packets corresponding to said second transmission slot in an idle time of the second transmission slot.

17. The Bluetooth communication device according to claim 16, further comprising:

a package control unit, used for controlling the package unit of standard Bluetooth packet to construct the plurality of second-standard Bluetooth packets;

a signal modulation unit, used for determining, before transmitting each of the plurality of second private-chain packets, a signal modulation mode of said second private-chain packet based on a type of one corresponding second-standard Bluetooth packet that is transmitted in the same transmission slot as said second private-chain packet, and a re-transmission detection unit, used for decoding one of the plurality of first private-chain packets in a first transmission slot to obtain a first signal data, performing a re-transmission detection on the first signal data to obtain a detection result, adding the detection result into one of the plurality of second private-chain packet that is transmitted in a second transmission slot, so that the second terminal of the device obtains the detection result after decoding the second private-chain packet, and determines whether or not to re-transmit the first private-chain packet in an idle time of a third transmission slot.

* * * * *